(12) United States Patent
Feucht et al.

(10) Patent No.: US 8,334,689 B2
(45) Date of Patent: Dec. 18, 2012

(54) INDUCTIVE DISPLACEMENT OR ROTATIONAL ANGLE SENSOR WITH A SCREENING PLATE ARRANGED BETWEEN TWO COILS

(75) Inventors: Thomas Feucht, Wimsheim (DE); Ulrich Guecker, Schwieberdingen (DE); Friedbert Roether, Cleebronn (DE); Falk Hecker, Markgroeningen (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 131 days.

(21) Appl. No.: 12/452,801

(22) PCT Filed: Jul. 17, 2008

(86) PCT No.: PCT/EP2008/005836
§ 371 (c)(1),
(2), (4) Date: Mar. 31, 2010

(87) PCT Pub. No.: WO2009/015777
PCT Pub. Date: Feb. 5, 2009

(65) Prior Publication Data
US 2010/0277162 A1 Nov. 4, 2010

(30) Foreign Application Priority Data
Aug. 2, 2007 (DE) .......................... 10 2007 036 200

(51) Int. Cl.
*G01B 7/30* (2006.01)
(52) U.S. Cl. .......... 324/207.25; 324/207.16; 324/207.17
(58) Field of Classification Search ............. 324/207.25, 324/207.17, 207.16; G01D 5/20
See application file for complete search history.

(56) References Cited

U.S. PATENT DOCUMENTS

| 3,864,614 A | | 2/1975 | Olsen | |
|---|---|---|---|---|
| 5,867,022 A | | 2/1999 | Eden et al. | |
| 6,288,535 B1 | * | 9/2001 | Chass | 324/207.2 |
| 6,310,476 B1 | * | 10/2001 | Kawanami et al. | 324/241 |
| 2003/0231013 A1 | * | 12/2003 | Faymon et al. | 324/166 |
| 2004/0085063 A1 | | 5/2004 | Jin et al. | |
| 2004/0189285 A1 | * | 9/2004 | Uenoyama | 324/207.12 |

FOREIGN PATENT DOCUMENTS
DE   199 55 144   6/2001
(Continued)

OTHER PUBLICATIONS

European Patent Office, Translation of International Preliminary Report on Patentability and Written Opinion, Apr. 1, 2010, from International Patent Application No. PCT/EP2008/005836, filed on Jul. 17, 2008.

(Continued)

*Primary Examiner* — Huy Q Phan
*Assistant Examiner* — Temilade S Rhodes-Vivour
(74) *Attorney, Agent, or Firm* — Kenyon & Kenyon LLP

(57) ABSTRACT

An inductive displacement or rotational angle sensor including at least one electrical coil which is provided with turns, and an influencing element which interacts with said coil and produces a different inductance of the least one coil as a function of its position, characterized in that at least two separate coils which are arranged coaxially with respect to a coil axis and have an axial interspacing are provided, it being possible for the influencing element to enter said interspacing with a degree of overlap, which is dependent on its position, with the magnetic fields which are generated by the coils.

12 Claims, 4 Drawing Sheets

FOREIGN PATENT DOCUMENTS

| | | |
|---|---|---|
| EP | 0 797 078 | 9/1997 |
| EP | 1 562 024 | 8/2005 |
| EP | 1562024 A2 * | 8/2005 |
| FR | 2 790 313 | 9/2000 |
| FR | 2790313 A1 * | 9/2000 |
| WO | 00/25093 | 5/2000 |

OTHER PUBLICATIONS

Examination Report of priority application, DE 102007036200.7, dated Nov. 24, 2011 from German Patent Office.

* cited by examiner

INDUCTIVE DISPLACEMENT OR ROTATIONAL ANGLE SENSOR WITH A SCREENING PLATE ARRANGED BETWEEN TWO COILS

FIELD OF THE INVENTION

The present invention is based on an inductive displacement or rotational angle sensor including at least one electrical coil which is provided with turns, and an influencing element which interacts with said coil and, as a function of its position, produces a different inductance of the least one coil.

BACKGROUND INFORMATION

An inductive rotational angle sensor of this generic type is discussed, for example, in EP 0 797 078 A1. In the known rotational angle sensor, the coil is wound onto a box-like coil former comprising a non-magnetically permeable material, of which the lateral openings are partially covered by metal sheets comprising magnetically permeable material. The rotatable influencing element is attached to the shaft in the manner of a flag in this case and is mounted completely within the coil former in every rotation position. The rotatable influencing element overlaps with the lateral metal sheets differently, depending on the rotation position. The linear response of the rotational angle sensor is then achieved by the substantially linear dependence of the area of overlap which forms between the rotatable influencing element and the metal sheets. Rotation of the shaft changes the angular position of the rotatable influencing element and therefore also the area of overlap with the metal sheets, this resulting in a measurable change in the magnetic resistance of the magnetic circuit, and therefore in the inductance.

The exemplary embodiments and/or exemplary methods of the present invention is based on the object of further developing an inductive displacement or rotational angle sensor of the type mentioned in the introduction in such a way that it can be produced in a cost-effective manner and is of robust design.

According to the exemplary embodiments and/or exemplary methods of the present invention, this object may be achieved by the features described herein.

SUMMARY OF THE INVENTION

The exemplary embodiments and/or exemplary methods of the present invention is based on the idea that at least two separate coils which are arranged coaxially with respect to a coil axis and have an axial interspacing are provided, it being possible for the influencing element to enter said interspacing with a degree of overlap, which is dependent on its position, with the magnetic fields which are generated by the coils.

Insertion of the influencing element which is at least partially composed of a magnetic material into the interspacing between the coils influences firstly the self-inductance of the coils and secondly the mutual inductance, this being used to generate a displacement- or rotational angle-dependent measurement signal. The embodiment according to the present invention requires a robust sensor which is of particularly simple design.

Advantageous developments of and improvements to the exemplary embodiments and/or exemplary methods of the present invention specified herein are possible by virtue of the further measures described herein.

In order to produce a rotational angle sensor, the influencing element may be configured to rotate about a shaft which is parallel to the coil axis in order to transmit the rotary movement which is to be sensed, and can enter the axial interspacing with a degree of overlap, which is dependent on its rotation position, with the magnetic fields which are generated by the coils.

Furthermore, the at least two coils are connected, for example, in series.

According to an exemplary development, the influencing element at least partially comprises a ferromagnetic material. In this case, the coils may be connected up in opposite directions. In this case, there is substantially no coupling between the inductances L of the coils. The relative change in the mutual inductance M with the influencing element inserted or rotated into the interspacing and without the influencing element inserted or rotated into the interspacing is then greater than the relative change in the individual self-inductances L of the coils.

According to a further embodiment, the influencing element can at least partially comprise a paramagnetic or diamagnetic material. In this case, the influencing element is, for example, produced from a metal sheet and at least partially comprises aluminum. In this case, the coils may be connected up in the same direction. In this embodiment, with the influencing element inserted or rotated into the interspacing and without the influencing element inserted or rotated into the interspacing, the relative change in the individual self-inductances L of the coils is greater than the relative change in the mutual inductance M.

The axial interspacing between the coils may be small compared to the longitudinal extent of the coils in the direction of the coil axis.

A particularly elegant configuration is produced when the rotatable influencing element is a body which is eccentrically mounted in relation to the shaft.

Furthermore, the cross section of the rotatable influencing element can be designed in such a way that the inductance of the coils has a linear dependence on the rotational angle of the rotatable influencing element at least in a rotational angle range of less than or equal to 360 degrees. Last but not least, a rotational angle sensor contributes to a simple and cost-effective design of a rotational angle sensor when the rotatable influencing element is arranged such that it can pivot in a plane perpendicular to the shaft or perpendicular to the coil axis and it is interposed, for example, between the end faces of the coils in at least one rotation position since the rotatable influencing element can overlap, with a degree of overlap which is dependent on its rotation position, with an imaginary axial extension of the coil interior spaces in which the magnetic field lines which are generated by the coils are concentrated.

The following description of exemplary embodiments provides more precise details.

Exemplary embodiments of the present invention are explained in greater detail in the following description and are illustrated below in the drawings.

DETAILED DESCRIPTION

One application of a rotational angle sensor 1 according to the present invention involves, for example, measuring the level, that is to say the distance between the vehicle frame and an axle, in an electronic level control system of a pneumatic suspension system of a vehicle, and to this end the rotational angle sensor 1 being mounted on a frame of the vehicle and the movement between the vehicle frame and the axle being transmitted via a lever mechanism. The angle measured by the rotational angle sensor then represents a measure of the level of the vehicle frame in relation to the axle.

Figure 1:
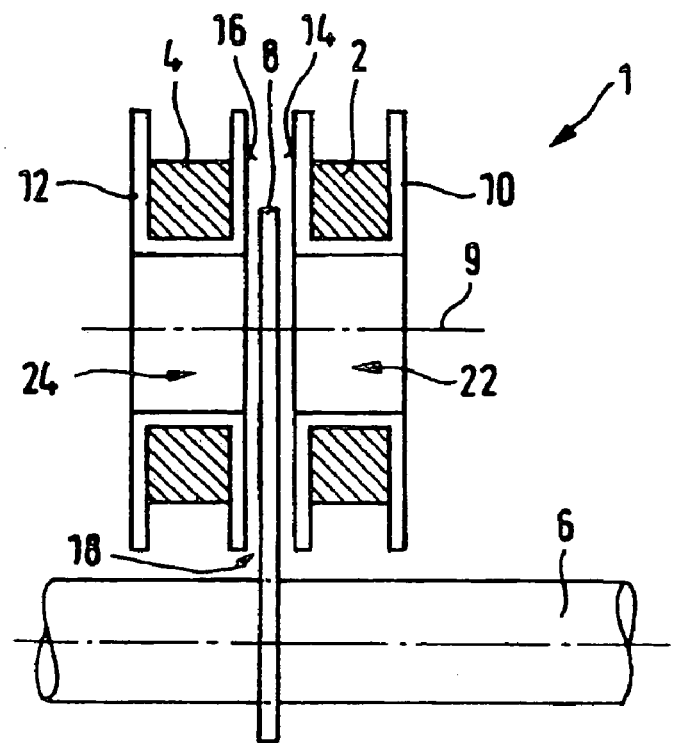
FIG. 1 shows a schematic cross-sectional view of a rotational angle sensor according to an exemplary embodiment of the present invention.

In order to explain the exemplary embodiments and/or exemplary methods of the present invention using an example, FIG. 1 shows a rotational angle sensor 1 according to an exemplary embodiment of the present invention. The rotational angle sensor 1 serves to convert a mechanical rotational movement into an electrical signal, which is proportional to the rotational angle, as part of a non-contact measurement method.

To this end, the rotational angle sensor 1 comprises at least two coils 2, 4, which are provided with electrically conductive turns, and an influencing element 8 which interacts with said coils and can be rotated about a shaft 6 in order to transmit the rotational movement to be sensed. The rotatable influencing element 8 is intended to produce a different inductance L of the coils 2, 4 as a function of the rotation position of said coil.

The following physical foundations which serve for the measurement principle will be described in the text which follows. In general, a current I generates, in a cylindrical coil, a magnetic field with a field strength H:

$$H = I \cdot \frac{n}{l} \quad (1)$$

where n is the number of turns and l is the coil length. The field strength H generates a magnetic flux density B $$B = \mu_r \cdot \mu_0 \cdot H \quad (2)$$

where $\mu_0$ is the permeability and $\mu_r$ is the relative permeability, wherein:

$\mu_r < 1$ for diamagnetic materials,
$\mu_r > 1$ for paramagnetic materials, and
$\mu_r \gg 1$ for ferromagnetic materials.

A change in the magnetic flux density B induces, in the coil, a voltage $U_{ind}$:

$$U_{ind} = n \cdot \dot{B} \cdot A \quad (3)$$

Equations (1) to (3) then give, for the induced voltage $U_{ind}$ $$U_{ind} = n \cdot A \cdot \mu_r \cdot \mu_0 \frac{n}{l} \cdot \dot{I} \quad (4)$$

The inductance L of the coil is then:

$$L = n^2 \cdot \mu_r \cdot \mu_0 \cdot \frac{A}{l} \quad (5)$$

The two coils 2, 4 are arranged coaxially with respect to a common coil axis 9 and are separate, that is to say each of the coils 2, 4 has its own coil former 10, 12 on which a coil winding comprising electrically conductive wire, for example, copper wire, is wound in each case, and also has its own connections. An axial interspacing 18 is provided between the end faces 14, 16 of the coils 2, 4 which are the directed toward one another and are arranged perpendicular to the coil axis 9, it being possible for the influencing element 8, which can be rotated about the shaft 6 which is parallel to the coil axis 9, to enter said interspacing with a degree of overlap, which is dependent on its rotation position, with the magnetic field which is generated by the coils 2, 4.

The two coils 2, 4 are preferably of hollow-cylindrical design and each have a coil interior space 22, 24, with the coil interior space 22 of one coil 2 being aligned with an imaginary extension of the coil interior space 24 of the other coil 4 so as to bridge the interspacing 18, because the coils 2, 4 are cylindrical coils with inside and outside diameters of preferably the same size. The axial interspacing 18 is preferably small compared to the longitudinal extent of the coils 2, 4 in the direction of the coil axis 9.

The coils 2, 4 are preferably connected in series in opposite directions or in the same direction, and therefore magnetic fields of opposite directions or of the same direction are generated at least in the associated coil interior spaces 22, 24 of said coils, that is to say that the magnetic field lines of the coils 2, 4 have the same direction or have opposite directions at least in the region of the coil interior spaces 22, 24.

Figure 2:
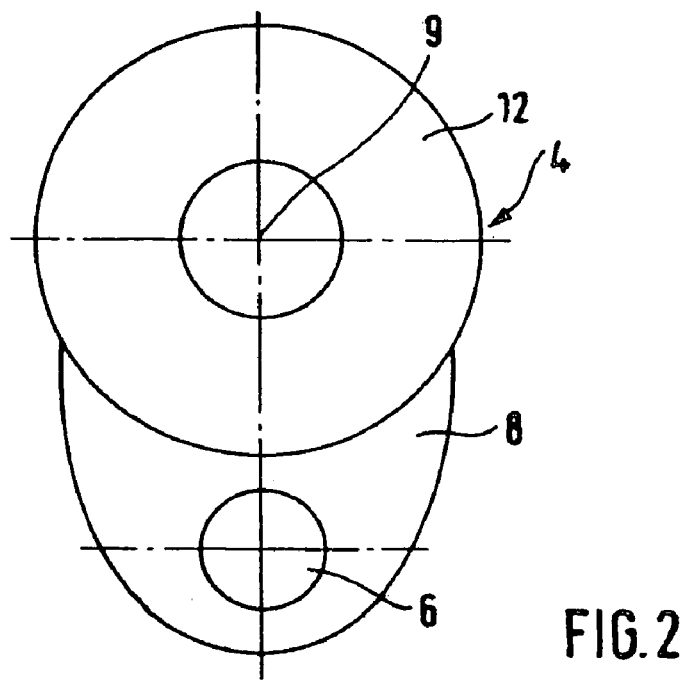
FIG. 2 shows an end view of the rotational angle sensor from FIG. 1.

The cross section of the rotatable influencing element 8 is designed, in particular, in such a way that the inductance L of the coils 2, 4 has a linear dependence on the rotational angle of the rotatable influencing element 8 at least in a rotational angle range of less than or equal to 360 degrees. As shown in FIG. 2, the rotatable influencing element 8 is preferably a body which is mounted eccentrically in relation to the shaft 6, in this case with an approximately cam-like cross section for example. Furthermore, the rotatable influencing element 8 is preferably of integral design. As an alternative, the rotatable influencing element 8 could contain a plurality of formations which are arranged on its circumference and which each have an associated measuring range, for example 120°. In this case, the rotatable influencing element 8 has, for example, a clover leaf- or gear wheel-shaped design.

Furthermore, the rotatable influencing element 8 is preferably produced at least partially from a ferromagnetic material, this being understood to be a magnetically permeable or soft-magnetic material which has a relative permeability $\mu \gg 1$ and a magnetic susceptibility $X > 0$. Ferromagnetic materials of this type include, for example, iron, cobalt or nickel. Said materials considerably strengthen the magnetic field passing through them by reducing the magnetic resistance.

As an alternative, the rotatable influencing element 8 may be produced from several parts and/or be produced at least partially from a paramagnetic material, that is to say that the material has a relative permeability μ>1 and a magnetic susceptibility X>0. Ferromagnetic materials of this type include, for example, platinum or aluminum. Said materials slightly strengthen the magnetic field passing through them.

Last but not least, the rotatable influencing element 8 could be produced at least partially from a diamagnetic material, that is to say that the material has a relative permeability μ<1 and a magnetic susceptibility X<0. Diamagnetic materials of this type include, for example, copper and silver. They slightly weaken the magnetic field passing through them.

The rotatable influencing element 8 is particularly preferably produced from a metal sheet, for example, an aluminum sheet. Insertion of the rotatable influencing element 8, which at least partially comprises a magnetic material, into the interspacing 18 between the two coils 2, 4 influences firstly the self-inductances $L_1$ and $L_2$ of the two coils 2, 4 and secondly the mutual inductance M.

Against this background, the manner of operation of the rotational angle sensor 1 according to the present invention is as follows: on account of a rotation of the shaft 6 in any direction, the intention being for this rotation to be sensed, the angular position of the rotatable influencing element 8 changes, as does the penetration depth of said influencing element into the interspacing 18 between the coils 2, 4. This change in the penetration depth or the area of overlap with an imaginary axial extension of the coil interior spaces 22, 24 changes the self-inductances $L_1$ and $L_2$ of the coils 2, 4 and the mutual inductance M of said coils, this being used to acquire signals.

The coils 2, 4 can be excited, for example, by a microprocessor which feeds square-wave, sinusoidal or any other desired pulses of an AC voltage source to the coils 2, 4. The total inductance of the coils 2, 4 can then be determined from the duration of the decay of the pulses to a lower limit value. In this case, the rotational angle acting on the shaft 6 is determined by a time measurement.

Figure 3:
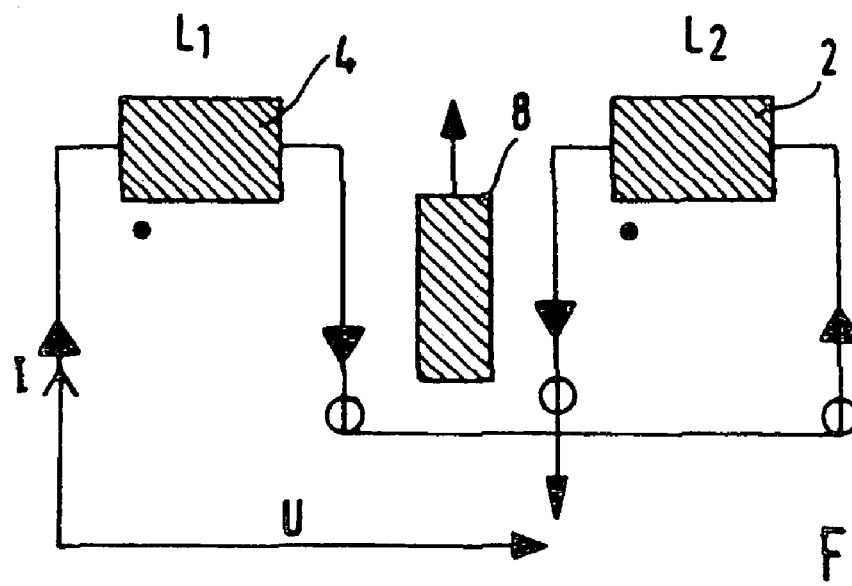
FIG. 3 shows a schematic circuit diagram of two coils according to an exemplary embodiment which are connected up in opposite directions and are used in the rotational angle sensor of FIG. 1 and FIG. 2.

FIG. 3 shows an exemplary embodiment in which the coils, 2, 4 are connected up in opposite directions, with the dot indicating the winding direction of the turns. As illustrated in said figure, the current I runs through the coils 2, 4 in opposite directions. In this exemplary embodiment, the rotatable influencing element 8 is produced from a ferromagnetic material at least in the region of overlap with the two coils 2, 4.

Figure 4A:
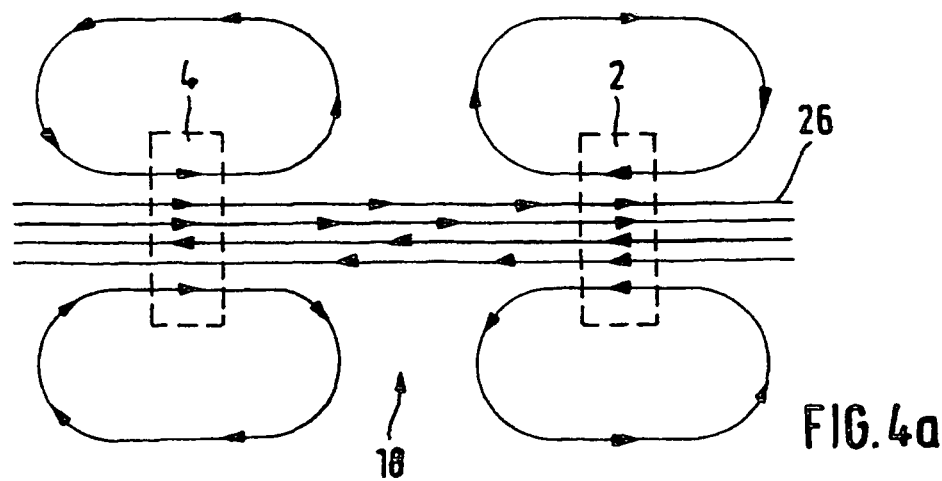
FIGS. 4a, 4b and 4c show the profile of the magnetic field lines in the region of the coils of FIG. 3, which are connected up in opposite directions, as a function of the rotation position of a ferromagnetic influencing element which is inserted into the interspacing between the coils.
Figure 4B:
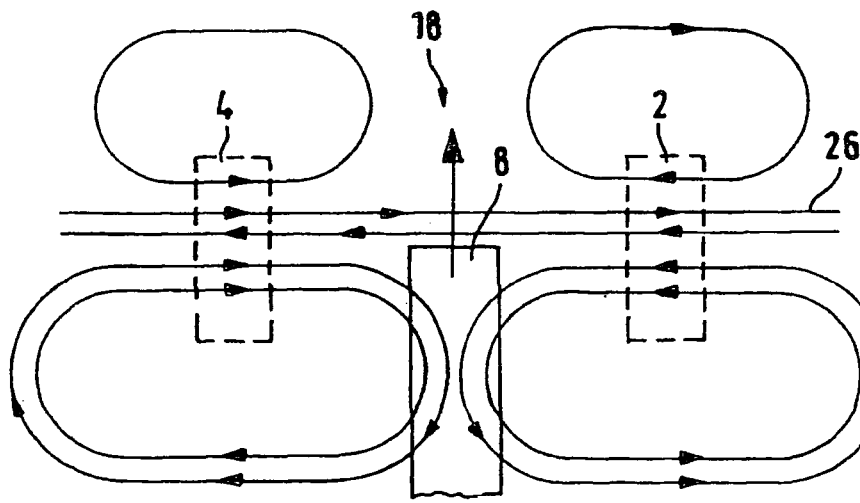
Figure 4C:
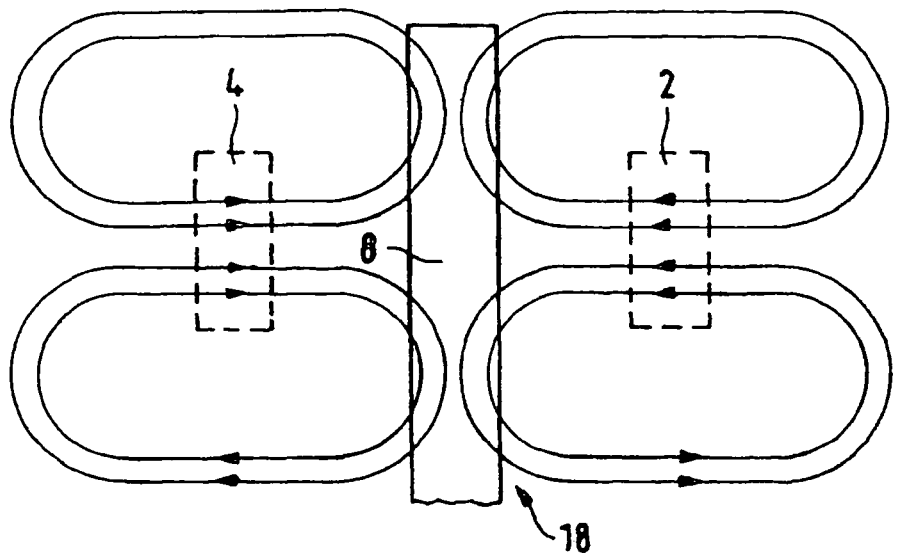

FIGS. 4*a* to 4*c* show, in contrast, the profile of the magnetic field lines 26 in the region of the coils 2, 4, which are connected up in opposite directions, of FIG. 3 as a function of the entry depth of the rotatable influencing element 8 into the interspacing 18 between the coils 2 and 4, where FIG. 4*a* shows the situation with the ferromagnetic influencing element 8 not yet inserted, FIG. 4*b* shows the situation with the ferromagnetic influencing element 8 partially inserted, and FIG. 4*c* shows the situation with the ferromagnetic influencing element 8 fully inserted.

If the rotatable influencing element 8 is not yet rotated into the interspacing 18, connection of the two coils 2 and 4 in opposite directions ensures that the magnetic field lines 26 generated by the coils 2, 4 run in opposite directions to one another in the region of the coil interior spaces 22, 24, as shown in FIG. 4*a*.

The self-inductances $L_1$ and $L_2$ of the coils 2, 4 are of the same magnitude, assuming coils 2, 4 are of the same construction, and are at a minimum; the mutual inductance M, however, is at a maximum and the overall inductance $L_{tot}$ is:

$$L_{tot}=L_1+L_2-2M \quad (6)$$

In the present case, this total inductance $L_{tot}$ is relatively small on account of the low self-inductances $L_1$ and $L_2$ and the relatively large mutual inductance M. The two coils 2, 4 are coupled.

However, partial entry of the influencing element 8 into the interspacing 18 according to FIG. 4*b* weakens the coupling between the two coils 2, 4.

If, in contrast, the rotatable influencing element 8 is rotated or enters the interspacing 18 to a maximum extent, the self-inductances $L_1$ and $L_2$ are at a maximum on account of the diversion or deflection of the magnetic field lines 26 by the ferromagnetic influencing element 8, but the mutual coupling M is at a minimum, and therefore the total inductance $L_{tot}$ according to equation (6) is relatively large. The ferromagnetic influencing element 8 inserted into the interspacing 18 virtually screens the two coils 2, 4 from one another. Accordingly, there is essentially no longer any coupling between the inductances $L_1$ and $L_2$ in this case.

The relative change in the mutual inductance M with the influencing element 8 rotated into the interspacing 18 and without the influencing element 8 rotated into the interspacing 18 (FIG. 4*a* and FIG. 4*c*) is greater than the relative change in the individual self-inductances $L_1$ and $L_2$ of the two coils 2, 4.

Figure 5:
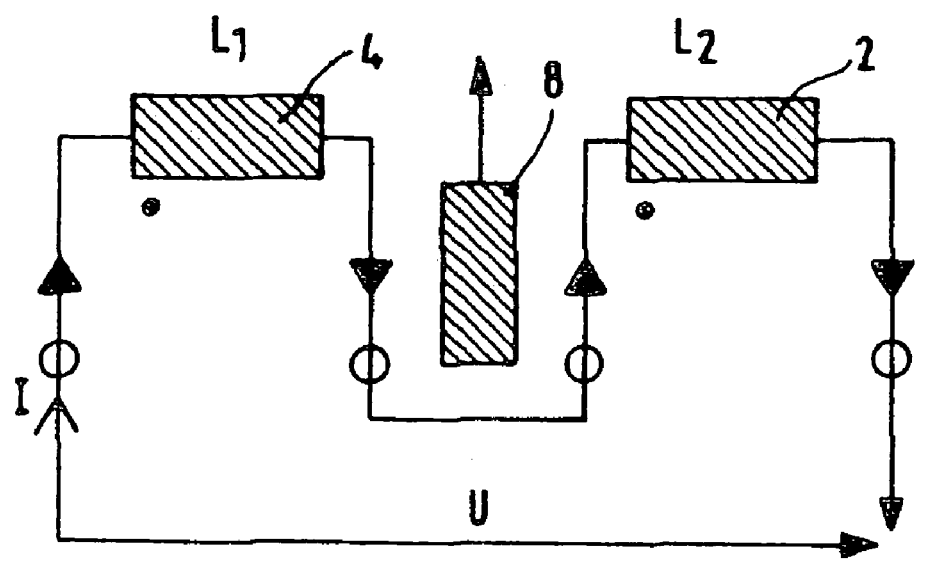
FIG. 5 shows a schematic circuit diagram of two coils according to a further embodiment which are connected up in the same direction and used in the rotational angle sensor of FIG. 1 and FIG. 2.

FIG. 5 shows a further embodiment in which the coils 2, 4 are connected up in the same direction. As illustrated in said figure by arrows, the current I runs in the same direction in the coils 2, 4. In this exemplary embodiment, the rotatable influencing element is produced from a diamagnetic or paramagnetic material at least in the region of overlap with the two coils 2, 4.

Figure 6A:
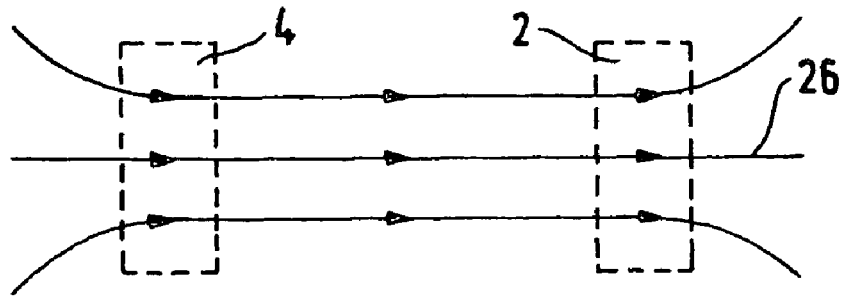
FIGS. 6a, 6b and 6c show the profile of the magnetic field lines in the region of the two coils of FIG. 5, which are connected up in the same direction, as a function of the rotation position of a para- or diamagnetic influencing element which is inserted into the interspacing between the coils.
Figure 6B:
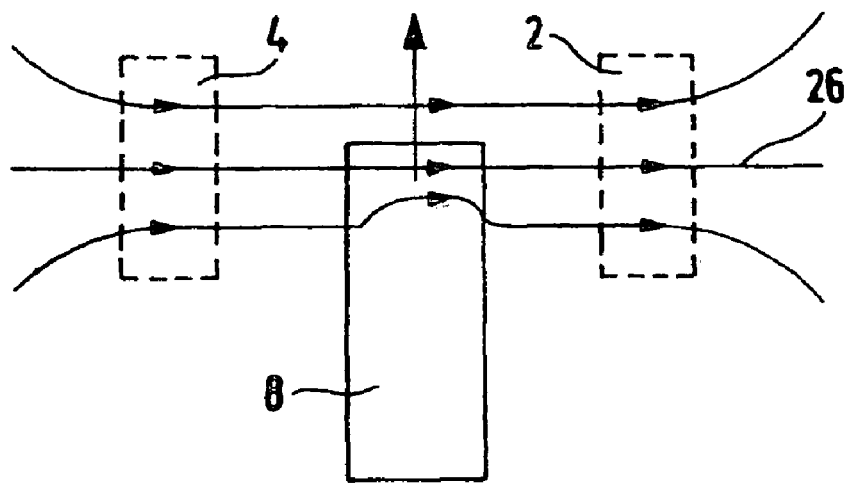
Figure 6C:
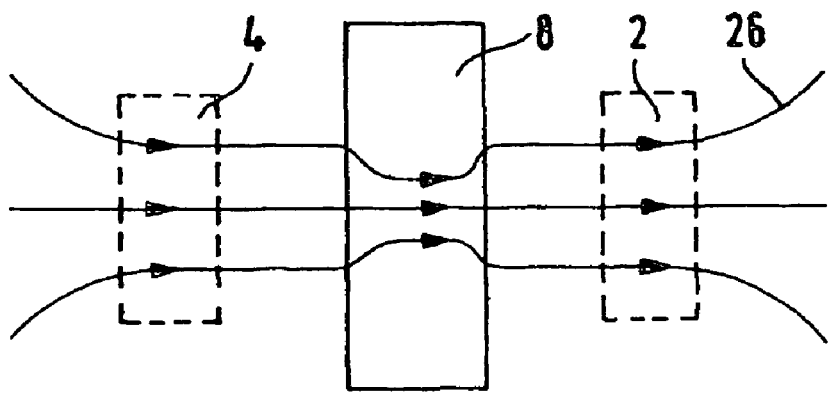

In contrast, FIG. 6*a* to FIG. 6*c* show the profile of the magnetic field lines 26 in the region of the coils 2, 4 of FIG. 5, which are connected up in the same direction, as a function of the entry depth of the rotatable influencing element 8 into the interspacing 18 between the coils 2, 4, where FIG. 6*a* shows the situation with the influencing element 8 not yet inserted, FIG. 6*b* shows the situation with the influencing element 8 partially inserted, and FIG. 6*c* shows the situation with the influencing element 8 fully inserted.

If the rotatable influencing element 8 is not yet rotated into the interspacing 18, connection of the two coils 2 and 4 in the same direction ensures that the magnetic field lines 26 generated by the coils 2, 4 run in the same direction to one another in the region of the coil interior spaces 22, 24, as shown in FIG. 4*a*. The self-inductances $L_1$ and $L_2$ of the coils 2, 4 are of the same magnitude, assuming coils 2, 4 are of the same construction, and are at a minimum; the mutual inductance M is likewise at a maximum and the overall inductance $L_{tot}$ is:

$$L_{tot}=L_1+L_2+2M \quad (7)$$

In the present case, this total inductance $L_{tot}$ is relatively small on account of the low self-inductances $L_1$ and $L_2$ and the low mutual inductance M.

If, in contrast, the rotatable influencing element 8 is rotated into the interspacing 18 to a certain extent, the magnetic flux density B increases, as a result of which the self-inductances $L_1$ and $L_2$ of the coils 2, 4 also increase (FIG. 6*b*).

If the influencing element 8 is rotated completely into the interspacing 18, the magnetic flux density B is at a maximum, this producing maximum self-inductances $L_1$ and $L_2$; furthermore, the mutual coupling M is also at a maximum, and therefore the total inductance $L_{tot}$ according to equation (7) is at a maximum level.

In this embodiment, the relative change in the individual self-inductances $L_1$ and $L_2$ of the two coils 2, 4 is greater than the relative change in the mutual inductance M with the influencing element 18 rotated into the interspacing 18 and without the influencing element 8 rotated into the interspacing 18 (FIG. 6a and FIG. 6c).

The exemplary embodiments and/or exemplary methods of the present invention is not restricted to rotational angle sensors. It can also be used in displacement sensors in which the influencing element 8 can, with a linear movement, enter the interspacing 18 between the coils 2, 4 with a degree of overlap, which is dependent on its position, with the magnetic fields which are generated by the coils 2, 4.

The List of Reference Signs is as Follows:
- 1 Rotational angle sensor;
- 2 Coil;
- 4 Coil;
- 6 Shaft;
- 8 Influencing element;
- 9 Coil axis;
- 10 Coil former;
- 12 Coil former;
- 14 End face;
- 16 End face;
- 18 Interspacing;
- 22 Coil interior space;
- 24 Coil interior space; and
- 26 Magnetic field lines.

The invention claimed is:

1. A rotational angle sensor, comprises:
at least one electrical coil which is provided with turns;
an influencing element which interacts with said coil and produces a different inductance of the least one coil as a function of a rotation position of the influencing element; and
at least two separate coils which are arranged coaxially with respect to a coil axis and which have an axial interspacing;
wherein:
the influencing element is able to enter said interspacing with a degree of overlap, which is dependent on the rotation position, with the magnetic fields which are generated by the coils,
the influencing element is configured to rotate about a shaft which is parallel to the coil axis to transmit a rotary movement which is to be sensed, and can enter the axial interspacing with a degree of overlap, which is dependent on the rotation position, with the magnetic fields which are generated by the coils,
the influencing element is a body which is eccentrically mounted in relation to the shaft and is arranged in a plane perpendicular to the coil axis, and
wherein at least one coil has a coil interior space with a cylindrical cross-section;
and wherein the cross section of the rotatable influencing element is configured so that the inductance of the coils has a linear dependence on the rotational angle of the rotatable influencing element, at least in a rotational angle range of less than or equal to 360 degrees.

2. The rotational angle sensor of claim 1, wherein the coils are connected to one another in series.

3. The rotational angle sensor of claim 1, wherein the influencing element includes a ferromagnetic material.

4. The rotational angle sensor of claim 2, wherein the coils are connected up in opposite directions.

5. The rotational angle sensor of claim 2, wherein the influencing element includes one of a paramagnetic material and a diamagnetic material.

6. The rotational angle sensor of claim 5, wherein the rotatable influencing element is produced from a metal sheet and includes aluminum.

7. The rotational angle sensor of claim 5, wherein the coils are connected up in the same direction.

8. The rotational angle sensor of claim 1, wherein the axial interspacing is smaller than the longitudinal extent of the coils in a direction of the coil axis.

9. The rotational angle sensor of claim 1, wherein the rotatable influencing element is arranged so that it can pivot in a plane perpendicular to the shaft.

10. The rotational angle sensor of claim 1, wherein the rotatable influencing element overlaps with an imaginary axial extension of the coil interior spaces with a degree of overlap which is dependent on its rotation position.

11. The rotational angle sensor of claim 1, wherein the rotatable influencing element is interposed between the end faces of the coils in at least one rotation position.

12. The rotational angle sensor of claim 1, wherein at least one of the coils has a coil core including one of a ferromagnetic material and a plastic.

* * * * *